United States Patent [19]

Taniguchi et al.

[11] Patent Number: 5,219,685

[45] Date of Patent: Jun. 15, 1993

[54] ALKALINE MANGANESE CELL

[75] Inventors: Yasuyoshi Taniguchi; Koji Koide; Tsugiyasu Iwamaru, all of Osaka, Japan

[73] Assignee: Hitachi Maxell, Ltd., Osaka, Japan

[21] Appl. No.: 845,846

[22] Filed: Mar. 6, 1992

Related U.S. Application Data

[63] Continuation of Ser. No. 563,713, Aug. 7, 1990, abandoned.

[30] Foreign Application Priority Data

Aug. 11, 1989 [JP] Japan .................. 1-209057

[51] Int. Cl.$^5$ .............................. H01M 4/50
[52] U.S. Cl. .................. 429/217; 429/206; 429/218; 429/224
[58] Field of Search ............... 429/217, 224, 208, 206; 502/101

[56]         References Cited
          U.S. PATENT DOCUMENTS

| | | |
|---|---|---|
| 3,009,979 | 11/1961 | Corren et al. ............ 429/217 |
| 4,051,305 | 9/1977 | Benczur-Urmossy et al. ...... 429/217 |
| 4,133,856 | 1/1979 | Ikeda et al. ............ 429/224 |
| 4,405,699 | 9/1983 | Kruger ............ 429/224 |
| 4,451,542 | 5/1984 | Ishida et al. ............ 429/185 |
| 4,891,282 | 1/1990 | Nagaura et al. ............ 429/218 |
| 4,892,637 | 1/1990 | Sauer et al. ............ 429/42 |

Primary Examiner—Anthony McFarlane
Attorney, Agent, or Firm—Birch, Stewart, Kolasch & Birch

[57] ABSTRACT

A method of preparing a positive electrode active composition for use in an alkaline manganese cell comprising a negative electrode, a negative electrode active material, a positive electrode and a positive electrode composition inclusive of manganese dioxide as a positive electrode active material, an electrically conductive filler and low molecular weight polytetrafluoroethylene, wherein an amount of the low molecular weight polytetrafluoroethylene powder ranges from 0.1% to 0.3% by weight based on the total weight of manganese dioxide and the electrically conductive filler, which cell has small internal resistance and good discharge performance.

3 Claims, 1 Drawing Sheet

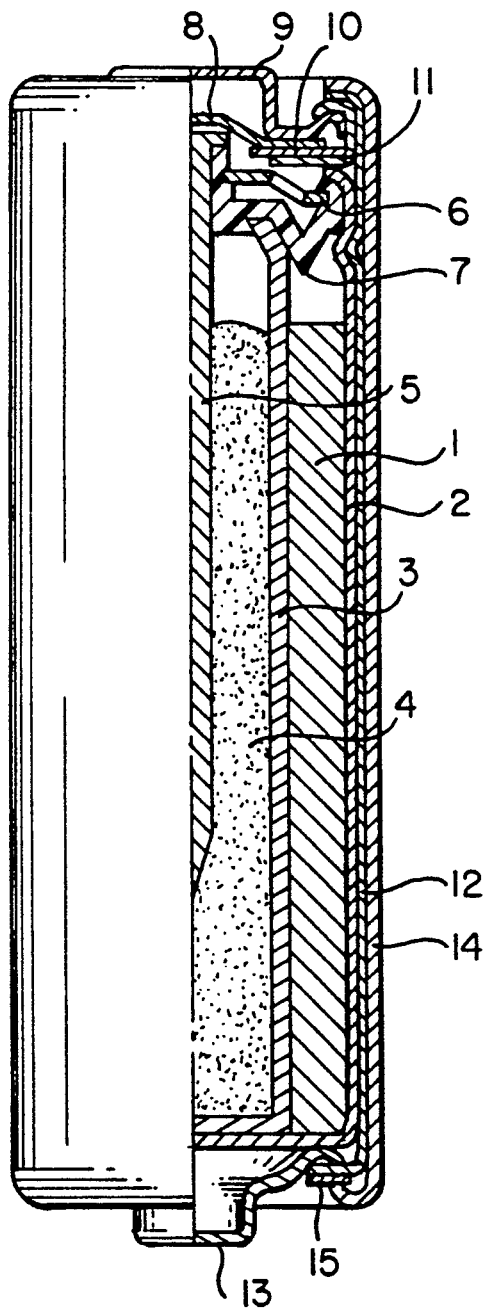

ALKALINE MANGANESE CELL

This application is a continuation of application Ser. No. 07/563,713 filed on Aug. 7, 1990, now abandoned.

BACKGROUND OF THE INVENTION

1. Field of the Invention

The present invention relates an alkaline manganese cell. More particularly, the present invention relates to an improvement of a binder to be contained in a positive electrode composition of an alkaline manganese cell.

2. Description of the Related Art

Hitherto, to improve the ease of weighing and moldability, a positive electrode composition of an alkaline manganese cell is prepared by wet mixing positive electrode components including manganese dioxide as a positive electrode active material and graphite powder or carbon black as an electrically conductive filler, extruding a resulting mixture with an extruder having a die with extrusion nozzles of 0.5 to 1.0 mm in diameter to produce granules, and sieving the granules to adjust a granule size distribution. In the above process, a water-soluble binder having gluing properties such as polysodium acrylate or carboxymethylcellulose is added to the mixture of positive electrode components to bind the components (cf, for example, Japanese Patent Kokai Publication No. 2266/1986).

However, since the water-soluble binder absorbs an electrolytic liquid, the molded positive electrode composition absorbs the electrolytic liquid, swells and softens. Therefore, adhesion of the positive electrode composition to a positive electrode can decreases, electron conductivity through the electrically conductive filler in the positive electrode composition decreases so that internal resistance increases, or the electrolytic liquid is absorbed by the positive electrode composition and migrates towards the positive electrode side so that an amount of the electrolytic liquid near a zinc negative electrode active material decreases, whereby a discharge reaction does not proceed sufficiently and a discharge time of the cell is shortened. Due to the above phenomena, discharge performance of the alkali manganese cell is deteriorated. Since the wet strength of swelled molded positive electrode composition decreases as time passes, the cell performance remarkably decreases, in particular, during storage.

It has been proposed to use low molecular weight polytetrafluoroethylene powder as a binder for the positive electrode composition in an amount of 0.3 to 3% by weight based on the total weight of manganese dioxide and the electrically conductive filler to suppress an increase of the internal resistance due to the absorbance of the electrolytic liquid with the positive electrode composition and decrease of discharge performance due to migration of the electrolytic liquid towards the positive electrode composition (cf. Japanese Patent Kokai Publication No. 220373/1989).

That is, the manganese dioxide powder, which is the positive electrode active material, the electrically conductive filler, such as graphite or carbon black, and the low molecular weight polytetrafluoroethylene powder are mixed with a small amount of an aqueous solution of potassium hydroxide or sodium hydroxide which is used to neutralize acidity due to manganese dioxide and prevent the corrosion of metals with strong oxidation by manganese dioxide, and water. Then, the resulting mixture is extruded with an extruder to form granulates and dried to adjust a water content in a range in which good moldability and easy weighing are achieved. The granules are charged in a mold and molded in a suitable form such as a ring. The formed positive electrode composition is placed in a positive electrode can to assemble the alkali manganese cell. The low molecular weight polytetrafluoroethylene powder absorbs a smaller amount of the electrolytic liquid than the conventional binder, such as polysodium acrylate or carboxymethylcellulose. Accordingly, deterioration of adhesion of the positive electrode composition to the positive electrode can be caused by excessive absorption of the electrolytic liquid by the positive electrode composition, and the decrease of electron conductivity in the positive electrode composition can be prevented. Since the electrolytic liquid on the negative electrode side is not excessively absorbed by the positive electrode composition, a sufficient amount of the electrolytic liquid is kept near the zinc negative electrode active material and the discharge reaction proceed sufficiently. Therefore, the discharge performance is not deteriorated.

By the use of low molecular weight polytetrafluoroethylene powder as the binder of the positive electrode composition, the components of the positive electrode composition are well bound, and powdering of the granules and disintegration of the molded positive electrode composition in the cell are prevented. However, since the low molecular weight polytetrafluoroethylene powder does not contribute to the discharge reaction, its addition reduces the amount of the positive electrode active material to be contained in the positive electrode composition, whereby the discharge capacity of the cell decreases. In addition, since the polytetrafluoroethylene powder has no conductivity, the electron conductivity in the positive electrode composition is decreased.

SUMMARY OF THE INVENTION

An object of the present invention is to provide an alkaline manganese cell comprising a positive electrode composition which contains low molecular weight polytetrafluoroethylene but is not disintegrated in the cell.

This object is achieved by an alkaline manganese cell which comprises a negative electrode, a negative electrode active material comprising zinc, a positive electrode composition comprising manganese dioxide as a positive electrode active material, an electrically conductive filler and low molecular weight polytetrafluoroethylene, an electrolytic liquid, and a positive electrode, wherein an amount of said low molecular weight polytetrafluoroethylene powder is not smaller than 0.1% by weight and smaller than 0.3% by weight based on the total weight of manganese dioxide and said electrically conductive filler.

BRIEF DESCRIPTION OF THE DRAWING

Figure is a partially cross-sectioned side view of the alkaline manganese cell of the present invention.

DETAILED DESCRIPTION OF THE INVENTION

In the present invention, the amount of low molecular weight polytetrafluoroethylene powder is not smaller than 0.1% by weight and smaller than 0.3% by weight based on the total weight of manganese dioxide and the electrically conductive filler in the positive electrode composition.

In the previous Japanese Patent Kokai Publication No. 220373/1989, the granulation of the positive electrode composition is studied on the extruded granules produced by extrusion with the extruder so as to improve easy weighing and moldability. Since the components of the positive electrode composition are wet mixed in the presence of water, the low molecular weight polytetrafluoroethylene powder is used in an amount of at least 0.3% by weight based on the total weight of manganese dioxide and the electrically conductive filler to prevent disintegration of the molded positive electrode composition.

In the present invention, the components of the positive electrode composition are mixed in the powder form, the mixture is formed in flake form by rolling and then the flakes are comminuted. Thereby, pulverization of the granules can be prevented even when the amount of the low molecular weight polytetrafluoroethylene is smaller than 0.3% by weight based on the total weight of manganese dioxide and the electrically conductive filler. That is, when the positive electrode composition is granulated in the form of flakes, large compression force is applied to the composition between the rolls so that the composition is flaked. Accordingly, the flake form material has a larger density than the granules produced by the extruder, and the comminuted material of the flake form material also has a larger density and is not easily pulverized. Further, when the positive electrode composition is molded, it can be highly filled in a mold, and the molded positive electrode composition has a larger density. Therefore, less than 0.3% by weight of the low molecular weight polytetrafluoroethylene can prevent disintegration of the molded positive electrode composition.

The low molecular weight polytetrafluoroethylene powder has a molecular weight of 10,000 to 900,000. It has a smaller molecular weight and is more flexible than general polytetrafluoroethylene powder having a molecular weight in the order of million or larger, and has a property that the powder particles adhere each other by compression. The low molecular weight polytetrafluoroethylene powder has no reactivity with manganese dioxide and therefore does not cause decrease of the voltage, unlike the conventionally used watersoluble binders. Further, since the low molecular weight polytetrafluoroethylene powder has a small coefficient of friction and good lubricity, the positive electrode composition has good flowability, so that the amount of the positive electrode composition to be filled in the mold is less fluctuated and in turn the cell performance is less fluctuated.

The low molecular weight polytetrafluoroethylene powder is commercially available, for example, under the trade names of Lubron L-2 and Lubron L-5 from Daikin Industries Limited.

It may be contemplated to use dispersion type polytetrafluoroethylene resin which is used in an organic electrolyte type lithium cell in place of the above low molecular weight polytetrafluoroethylene powder. When the dispersion type polytetrafluoroethylene resin comes in contact with an alkaline liquid with high concentration, resin particles are coagulated and cannot be homogeneously dispersed. Therefore, the dispersion type polytetrafluoroethylene resin cannot be used in the alkaline manganese cell.

In the present invention, the amount of the low molecular weight polytetrafluoroethylene powder is not smaller than 0.1% by weight and smaller than 0.3% by weight, preferably from 0.2 to 0.29% by weight based on the total weight of manganese dioxide and the electrically conductive filler.

When the amount is smaller than 0.1% by weight, the binding effect of the low molecular weight polytetrafluoroethylene cannot be sufficiently achieved even if the powder is comminuted from its flakes, and then the molded positive electrode composition is disintegrated in the cell so that the adhesion of the molded composition to the positive electrode can deteriorates. In addition, the electron conductivity in the positive electrode composition decreases so that the internal resistance may increase.

The reason why the amount is made smaller than 0.3% by weight is that, as the amount of the low molecular weight polytetrafluoroethylene increases, the discharge capacity decreases and the internal resistance increases.

The weight ratio of manganese dioxide to the electrically conductive filler is, in general, from 4:1 to 10:1, preferably from 6:1 to 10:1.

The elements other than the positive electrode composition and the structure of the alkaline manganese cell of the present invention can be the same as those in a conventional alkaline manganese cell.

The alkaline manganese cell of the present invention can be assembled in the same manner as a conventional alkaline manganese cell.

PREFERRED EMBODIMENTS OF THE INVENTION

The present invention will be illustrated by following Examples, in which "parts" and "%" are by weight unless otherwise indicated.

EXAMPLE 1

Manganese dioxide powder (80 parts), flake form graphite powder (10 parts) and low molecular weight polytetrafluoroethylene powder (Luburon L-2 manufactured by Daikin Industries Limited) (0.18 part) were mixed for 5 minutes. To the mixture, a 35 % aqueous solution of potassium hydroxide (2.5 parts) was added and further mixed for 10 minutes. The amount of the low molecular weight polytetrafluoroethylene was 0.2 % based on the total weight of manganese dioxide and the graphite powder.

The prepared positive electrode composition was pressed between a pair of rolls under compression pressure of 1.5 ton/cm to produce flakes. The flakes were comminuted and sieved to obtain granules of the positive electrode composition.

Then, the granules of the positive electrode composition (2.1 mg) were compression molded in a mold to produce a cylinder having a density of 3.2 g/cm$^3$, an inner diameter of 8.3 mm, an outer diameter of 12.4 mm and a height of 10 mm.

Four cylinders of the positive electrode composition were piled up in a positive electrode can made of Ni-plated iron. In the inner space of the cylinders, a core rod was inserted, and a punch which was slidingly installed around the core rod was lowered to press the upper edge of the piled cylinders to have the cylinders contact the inner surface of the positive electrode can. After lifting up the punch and removing the core rod, the opening edge of the positive electrode can was bent to form a circumferential groove near the opening. Then, a cup-form separator was inserted in the inner space of the piled and compressed cylinders, and an electrolytic liquid and a negative electrode active material were filled in the separator. Subsequently, the cell was assembled according to the conventional method to complete a LR 6 type cell of Figure.

The cell of Figure had the positive electrode composition 1 comprising manganese dioxide as the positive electrode active material, graphite and the low molecular weight polytetrafluoroethylene powder. The cylinders of the positive electrode composition 1 were contained in the positive electrode can 2. Inside the cylinders, the separator 3 was installed. In the separator 3, the negative electrode material 4 was filled. The negative electrode material was a mixture of calomel zinc powder and a gelled alkali electrolytic liquid which was prepared by adding a sodium salt of carboxymethylcellulose to an aqueous solution of potassium hydroxide with a high concentration. The cell of Figure further comprised a negative collector electrode 5, an annular support 6, a sealing element 7, a negative electrode connector plate 8, a negative electrode terminal 9, an insulating ring 10, heat-shrinkable resin tubes 11, 12, a positive electrode terminal 13, a metal armor can 14, and an insulating ring 15.

A cylinder of the positive electrode composition was horizontally placed and a load was applied on its upper end to examine breaking load. The breaking load was 560 g. The cylinders of the positive electrode composition were not disintegrated or broken during assembling the cell.

COMPARATIVE EXAMPLE 1

Manganese dioxide powder (80 parts), flake form graphite powder (10 parts) and polysodium acrylate powder (0.45 part) were mixed for 5 minutes. To the mixture, a 35% aqueous solution of potassium hydroxide (2.5 parts) and ion-exchanged water (13 parts) were added and further mixed for 10 minutes. The amount of polysodium acrylate was 0.5% based on the total weight of manganese dioxide and the graphite powder.

The positive electrode composition was extruded with an extruder to form granules and dried to a water content of 3%.

In the same manner as in Example 1 but using the above granules of the positive electrode composition, an alkaline manganese cell was assembled.

The breaking load for a cylinder of the positive electrode composition was 600 g.

COMPARATIVE EXAMPLE 2

In the same manner as in Comparative Example 1 but using carboxymethylcellulose as a binder in place of polysodium acrylate, a cell was assembled.

The breaking load was 550 g.

With the cells assembled in Example 1 and Comparative Examples 1 and 2, short-circuit current just after assembling and after storage at 60° C. for 20 days or 40 days was measured at 20° C. Also, a continuous discharge time till the end voltage of 0.9 V at a discharge resistance of 10 ohms and a discharge time of intermittent discharge (5 second discharge/5 second rest) at −20° C. till the end voltage of 0.9 V at 2 ohms were measured. The results are shown in Table 1.

TABLE 1

| Example No. | 1 | C. 1 | C. 2 |
|---|---|---|---|
| Short-circuiting current (A) | | | |
| Just after assembling | 11.0 | 10.3 | 10.2 |
| After storage at 60° C. for 20 days | 10.0 | 6.8 | 5.1 |
| After storage at 60° C. for 40 days | 10.7 | 5.2 | 4.6 |
| Continuous discharge time (hrs.) | | | |
| Just after assembling | 15.2 | 14.6 | 14.6 |
| After storage at 60° C. for 20 days | 15.0 | 13.5 | 12.5 |
| After storage at 60° C. for 40 days | 14.7 | 12.0 | 11.5 |
| Intermittent discharge time (min.) | | | |
| Just after assembling | 12.0 | 8.3 | 7.4 |
| After storage at 60° C. for 20 days | 11.3 | 7.4 | 5.2 |
| After storage at 60° C. for 40 days | 10.8 | 5.8 | 4.3 |

As understood from the results of Table 1, the cell assembled in Example 1 by using the low molecular weight polytetrafluoroethylene powder as the binder of the positive electrode composition had larger short-circuit current, namely smaller internal resistance than the cells assembled in Comparative Examples 1 and 2 by using the polysodium acrylate and carboxymethylcellulose, respectively. In particular, the short-circuit current less decreased after storage and also the discharge time less decreased after storage. This may be because, since the low molecular weight polytetrafluoroethylene powder absorbs a smaller amount of the electrolytic liquid than the binders used in Comparative Examples 1 and 2, the positive electrode composition does not swell through absorption of the electrolytic liquid so that the adhesion of the positive electrode composition to the positive electrode can is not deteriorated and the electron conductivity in the positive electrode composition does not decrease, and the positive electrode composition does not absorb the electrolytic liquid excessively so that a sufficient amount of the electrolytic liquid remains near the zinc negative electrode active material and the discharge reaction smoothly proceeds.

As seen from Table 1, the cell assembled in Example 1 had longer intermittent discharge time than those assembled in Comparative Examples 1 and 2. This may be because, in the cells assembled in Comparative Examples 1 and 2 by using polysodium acrylate and carboxymethylcellulose, respectively, the positive electrode composition absorbs the electrolytic liquid and swells and then the internal resistance increases, the amount of the electrolytic liquid near the zinc negative electrode active material decreases due to absorption of the electrolytic liquid by the positive electrode composition so that the discharge reaction does not proceed sufficiently, and dissolution of the binder in the electrolytic liquid increases viscosity of the electrolytic liquid so that ionic conductivity through the electrolytic liquid decreases.

In the following Examples 2 and 3 and Comparative Example 3, dependence of the short-circuit current and the discharge time on the amount of low molecular weight tetrafluoroethylene powder in the positive electrode composition will be explained.

EXAMPLES 2 AND 3 AND COMPARATIVE EXAMPLE 3

In the same manner as in Example 1 but changing the amount of low molecular weight polytetrafluoroethylene powder based on the total weight of manganese dioxide and graphite to 0.05, 0.10 or 0.29%, a cell was assembled.

A short-circuit current and a continuous discharge time till the end voltage of 0.9 V at a discharge resistance of 10 ohms were measured. The results are shown in Table 2.

TABLE 2

| Example No. | Amount of low molecular weight PTFE*) (%) | short circuit current (A) | Discharge time (hrs.) |
| --- | --- | --- | --- |
| Comp. Ex. 1 | 0.05 | 7.6 | 12.8 |
| Example 2 | 0.10 | 10.9 | 15.0 |
| Example 3 | 0.29 | 10.7 | 15.0 |

Note: *Polytetrafluoroethylene.

As shown in Table 2, the cells assembled according to the present invention in Examples 2 and 3 had large short-circuit current, namely a smaller internal resistance, and long discharge time, while the cell assembled in Comparative Example 2 had small short-circuit current and short discharge time. This may be because, since the amount of low molecular weight polytetrafluoroethylene was small in Comparative Example 3 and its binding effect was not sufficient, the molded positive electrode composition was disintegrated in the cell, so that the adhesion to the positive electrode can decreased and in turn the internal resistance increased.

The breaking load was measured by horizontally placing the ring form positive electrode composition and applying a load. The results are shown in Table 3.

TABLE 3

| Example No. | Amount of low molecular weight PTFE (%) | Breaking load (g) |
| --- | --- | --- |
| Comp. Ex. 3 | 0.05 | 420 |
| Example 2 | 0.10 | 520 |
| Example 3 | 0.29 | 580 |

As shown in Table 3, the cylinder form positive electrode compositions in Examples 2 and 3 in which the amounts of low molecular weight polytetrafluoroethylene were in the range of the present invention had breaking load exceeding 500 g, while that in Comparative Example 3 in which said amount was 0.05% had breaking load of 420 g and it was disintegrated in the cell which means that the discharge performance tends to be deteriorated.

What is claimed is:

1. A method of preparing a positive electrode active composition for use in an alkaline manganese cell which comprises:

providing manganese dioxide as a positive electrode active material;

adding to said manganese dioxide an electrically conductive filler to produce a mixture thereof such that a weight ratio of manganese dioxide to said electrically conductive filler ranges from 4:1 to 10:1;

mixing with said mixture of manganese dioxide and electrically conductive filler in an amount ranging from 0.1 to 0.3% by weight based on a total weight of said manganese dioxide and electrically conductive filler mixture, a polytetrafluoroethylene (PTFE) powder having a molecular weight of from 10,000 to 900,000 as a binder to produce said positive electrode active composition;

rolling said resulting positive electrode composition to produce said positive electrode composition in flake form; and comminuting said flakes to produce a final form of said positive electrode composition.

2. The method according to claim 1, wherein said polytetrafluoroethylene powder is present in an amount ranging from 0.2 to 0.29% by weight based on the total weight of said manganese dioxide and electrically conductive filler.

3. The method according to claim 1, wherein said electrically conductive filler added comprises graphite.

* * * * *